United States Patent Office 2,777,000
Patented Jan. 8, 1957

2,777,000

PROCESS FOR ALKYL ETHERS OF ALPHA-HYDROXYCUMENE

Thomas P. G. Shaw, Shawinigan Falls, Quebec, Canada, assignor to Shawinigan Chemicals Limited, Montreal, Quebec, Canada, a corporation of Canada No Drawing. Application September 27, 1954,
Serial No. 458,693

10 Claims. (Cl. 260—611)

This invention relates to the preparation of lower alkyl ethers of α-hydroxycumene. These ethers may be designated alternatively as 2-alkoxy-2-phenylpropane, α-alkoxycumene, or as the alkyl ethers of α,α-dimethylbenzyl alcohol, or of dimethylphenylcarbinol, or of α-hydroxycumene.

The preparation of the methyl ether of α-hydroxycumene from α-chlorocumene has been reported by Ziegler and Schnell in Annalen 437, 254 (1924) and by Ziegler, Crossman, Kleiner, and Schafer in Annalen 473, 18 (1929) but it appears that none of the other alkyl ethers have hitherto been made. The necessary α-chlorocumene has been prepared e. g. by Klages (Berichte 35, 2638, 1902), from α-hydroxycumene which in turn has been made from acetophenone by the use of Grignard reagents. It is obvious that the prior art method for the preparation of the methyl ether of α-hydroxycumene, requiring intermediate Grignard reagents, dimethylphenyl carbinol, and α-chlorocumene, is not convenient or cheap.

In accordance with the present invention, the ether of α-hydroxycumene and a saturated aliphatic primary alcohol containing one to six carbon atoms is prepared by reacting α-methylstyrene and the said alcohol in the presence of hydrogen chloride in an amount at least stoichiometrically equivalent to the α-methylstyrene, and recovering the said ether from the reaction mixture. The equations for the reaction are as follows:

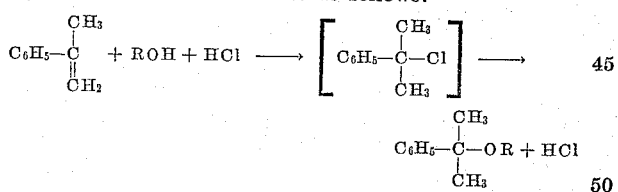

The invention is illustrated by the following examples:

*Example 1.—The methyl ether*

472 grams of α-methylstyrene (4 moles), 472 grams of methanol (14¾ moles) and 4 grams of dry cuprous chloride were placed in a stirred reaction vessel. Dry hydrogen chloride gas was passed into the mixture at a rapid rate, while holding the temperature of the mixture at 20° to 30° C. and continuing for about 1½ hours until about 150 grams of hydrogen chloride (4.1 mole) had been absorbed. The mixture was allowed to stand overnight and about 700 grams of water was added giving a two-layer system. Powdered sodium carbonate was then added with stirring until the system was neutral as indicated by the precipitation of the bluish green basic copper carbonate. This precipitate was filtered off, and the liquid layers were separated; then the organic layer was dried with calcium chloride, and fractionated at a pressure of 20 mm. mercury. The excess methanol, negligible amounts of methyl chloride, and some unreacted α-methylstyrene came over below 67° C. The crude product was recovered as a fraction at 67°–82° C. at reduced pressure (about 20 mm.). This was further fractionally distilled to yield a substantially pure product which was analysed with an infra-red spectrometer. Methyl ether of α-hydroxycumene found in all fractions amounted to 378 grams, which is 63.0% of the theoretical yield based on the total α-methylstyrene used, or 70.8% when corrected for recoverable α-methylstyrene in the two fractions.

*Example 2.—The butyl ether*

Example 1 was repeated in the same apparatus with the substitution of 1100 grams of butanol (14¾ moles) for the methanol. On fractionation of the dried organic layer at 20 mm. pressure the fraction below 100° C. contained the excess butanol, unreacted α-methylstyrene, some α-hydroxycumene, and a little of the butyl ether. The fraction at 100°–120° C. was redistilled to give the pure product. Yield of butyl ether of α-hydroxycumene: 631 grams, which is 82.1% of the theoretical yield based on the α-methylstyrene used, without credit for recoverable α-methylstyrene.

*Example 3.—The isobutyl ether*

This was like Example 1 but using 890 grams of isobutanol in place of methanol. On distillation of the crude product at 20 mm. pressure a fraction B. P. 120–130° C. was taken. The isobutyl ether of α-hydroxycumene accounted for in this and lower fractions amounted to 360 grams which is 47% of that theoretically possible without credit for unreacted α-methylstyrene.

The corresponding ethers were also made using essentially the same method by substituting respectively n-propyl alcohol, n-hexyl alcohol, and the mixture of amyl alcohols sold commercially as "Pentasol" in place of the other alcohols. The observed and calculated properties of the ethers were:

| Ether | B. P. at 20 mm. Hg | Specific Gravity | Refractive Index $\frac{20}{D}$ |
|---|---|---|---|
| Methyl | 78° C | 0.9438 | 1.4960 |
| Ethyl | 90° C | 0.930 | 1.4916 |
| n-Propyl | 106.3° C | 0.920 | 1.4879 |
| n-Butyl | 112° C | 0.912 | 1.4850 |
| Iso-Butyl | 125° C | 0.938 | 1.4839 |
| Amyl [1] | 137° C | 0.933 | 1.4839 |
| n-Hexyl | 105° C. (1.8 mm.) | 0.920 | 1.4823 |
| Methyl [2] | 78° C. (13 mm.) | 0.945 (D₄²⁰) | 1.4981 |

[1] The mixture of primary amyls from Pentasol.
[2] The data reported in Annalen 437, 254 (1924).

The process is applicable to the lower saturated primary alcohols (both normal and branched-chain) containing one to six carbon atoms, but gives conversions which decrease with increasing molecular weights of the alcohol. Alcohols containing more than six carbon atoms give conversions to the ether which are too low to be of interest. The conversions are zero or negligible when using secondary or tertiary alcohols. It is desirable to carry out the reaction in the presence of excess of the alcohol being reacted; higher yields of the ether product are obtained when the alcohol is in excess than are obtained when stoichiometric amounts only are used. An excess of about 300% is quite satisfactory, although smaller excesses are also beneficial.

The reaction may be carried out at temperatures within the range from about −9° C. to 50° C., the preferred range being from about 15° C. to 35° C. The hydrogen chloride gas is preferably added at a rate between one and two moles per hour per mole of α-methylstyrene when the temperature is 25° C., and may be added at higher rates at higher temperatures. The reactants are preferably kept dry, for water in an amount of about 1% by weight of the reactants reduces the conversion about 20%.

It is desirable to use an inhibitor of polymerization when the reaction is carried out at temperatures above 5° C. The preferred inhibitor is dry cuprous chloride; a concentration of one gram per mole of α-methylstyrene is effective.

The lower alkyl ethers of α-hydroxycumene are relatively high boiling liquids which, like many other ethers, are useful as solvents for specific resins, dyes, oils, etc., and fixatives for perfumes. Since they decompose to α-methylstyrene on heating above about 150° C., the ethers can be a useful controllable source for the slow evolution of α-methylstyrene formed in situ in a reaction by heating one of the ethers above 150° C.

I claim:

1. A method of preparing the ether of α-hydroxycumene and a saturated aliphatic primary alcohol containing one to six carbon atoms comprising reacting under anhydrous conditions α-methylstyrene and the said alcohol in the presence of hydrogen chloride in an amount at least stoichiometrically equivalent to the α-methylstyrene, and recovering the said ether from the reaction mixture.

2. A process as claimed in claim 1, wherein the reaction is carried out at a temperature between −9° and +50° C.

3. A process as claimed in claim 2, wherein the reaction is carried out at a temperature between 15° and 35° C.

4. A process as claimed in claim 1, wherein the reaction is carried out in the presence of an inhibitor of polymerization.

5. A process as claimed in claim 4, wherein the inhibitor of polymerization is cuprous chloride.

6. A process as claimed in claim 1, wherein the alcohol is methanol.

7. A process as claimed in claim 1, wherein the alcohol is ethanol.

8. A process as claimed in claim 1, wherein the alcohol is n-propanol.

9. A process as claimed in claim 1, wherein the alcohol is a primary butanol.

10. A process as claimed in claim 1, wherein the alcohol is a primary amyl alcohol.

References Cited in the file of this patent

UNITED STATES PATENTS

| | | |
|---|---|---|
| 2,056,915 | Wulff et al. | Oct. 6, 1936 |
| 2,248,518 | Stanley et al. | July 8, 1941 |
| 2,468,982 | Jansen | May 3, 1949 |